(12) United States Patent
Chen et al.

(10) Patent No.: US 7,420,984 B2
(45) Date of Patent: Sep. 2, 2008

(54) METHOD AND APPARATUS FOR MULTI-PHASE WIRELESS HANDSHAKING

(75) Inventors: John Chen, San Jose, CA (US); Brett Schein, Sunnyvale, CA (US); Prasanna Kannan, San Diego, CA (US); Tae-In Hyon, HwaSungSi (KR)

(73) Assignee: ArrayComm LLC, San Jose, CA (US)

( * ) Notice: Subject to any disclaimer, the term of this patent is extended or adjusted under 35 U.S.C. 154(b) by 762 days.

(21) Appl. No.: 10/841,690

(22) Filed: May 6, 2004

(65) Prior Publication Data

US 2005/0009529 A1   Jan. 13, 2005

Related U.S. Application Data

(60) Provisional application No. 60/469,499, filed on May 9, 2003.

(51) Int. Cl.
*H04J 3/16* (2006.01)
(52) U.S. Cl. ...................................... 370/437
(58) Field of Classification Search .................. None
See application file for complete search history.

(56) References Cited

U.S. PATENT DOCUMENTS

| | | | |
|---|---|---|---|
| 5,553,074 A * | 9/1996 | Acampora | 370/349 |
| 5,734,645 A | 3/1998 | Raith et al. | |
| 5,778,316 A * | 7/1998 | Persson et al. | 455/434 |
| 5,790,551 A * | 8/1998 | Chan | 370/458 |
| 5,943,316 A | 8/1999 | Davis | |
| 6,014,562 A * | 1/2000 | Weiss | 370/337 |
| 6,038,223 A | 3/2000 | Hansson et al. | |
| 6,459,680 B1 * | 10/2002 | Alperovich et al. | 370/230 |
| 6,535,736 B1 * | 3/2003 | Balogh et al. | 455/434 |
| 6,594,240 B1 * | 7/2003 | Chuah et al. | 370/328 |
| 6,674,765 B1 * | 1/2004 | Chuah et al. | 370/458 |
| 6,917,602 B2 * | 7/2005 | Toskala et al. | 370/335 |
| 7,155,236 B2 * | 12/2006 | Chen et al. | 370/329 |
| 7,227,855 B1 * | 6/2007 | Barratt et al. | 370/343 |
| 2006/0264220 A1 * | 11/2006 | Chen et al. | 455/454 |

* cited by examiner

*Primary Examiner*—Anh-Vu H Ly
(74) *Attorney, Agent, or Firm*—Blakely Sokoloff Taylor & Zafman LLP (57) ABSTRACT

Methods and apparatuses associated with multi-phase wireless handshaking. A user terminal enters handshaking with an access point. The access point may respond to an access request of the user terminal with an access assignment, and alternatively, with a message indicating an assignment will not be presently given. The handshaking process could then be completed at a later time.

59 Claims, 7 Drawing Sheets

METHOD AND APPARATUS FOR MULTI-PHASE WIRELESS HANDSHAKING

RELATED APPLICATION

The present Application claims the benefit of U.S. Provisional Patent Application Ser. No. 60/469,499, filed May 9, 2003, and entitled "RA/AA Relaxation Scheme: Method and Apparatus for Two-Phase Handshake in a Wireless Communication System," of common Inventorship, and assigned to ArrayComm, Inc.

FIELD

Embodiments of the invention relate to wireless communication, and in particular, a multi-phase handshake between wireless devices.

BACKGROUND

In wireless communication systems, user terminals (UTs) and access points or base stations (BSs) exchange data over an air interface. The BSs may be geographically distributed, e.g., into cells. The UTs and BSs establish an air interface through an exchange of wireless communication signals. The process of exchanging signals to establish an air interface may be referred to as "handshaking." The handshaking process may include a UT requesting a resource, such as a traffic channel (TCH), and a BS determining a TCH assignment for the UT, and responding to the request with the channel assignment.

One handshaking technique involves assigning a TCH stream on a conventional channel resource using a random access channel (RACH). The RACH may be a channel, e.g., a control channel, which is not specifically assigned to any particular UT, and may be accessed by a UT seeking a TCH assignment on a BS. This technique traditionally requires the handshaking to complete in a single frame. For example, a random access signal (RA) may be sent on the uplink of a frame and an access assignment signal (AA) is sent on the downlink of the same frame. The AA will typically indicate the TCH channel assignment determined by the BS. The frame may be an exchange period defined in a wireless communication protocol.

Although this technique is relatively simple, it is difficult to implement in a distributed base station architecture. In a distributed base station architecture, the processing may not all be performed with a single processor. A general purpose processor (GPP) that is typically not a real-time processor may not have the capability to meet the real-time requirements of making an assignment of available resources and transmitting the assignment in the same frame as the resource request.

In a distributed architecture, a combination of one or more GPPs and application specific processors (ASPs), e.g., digital signal processors (DSPs), application specific integrated circuits (ASICs), etc., is generally used. An ASP may control a set or subset of communication resources, for example, spatial channels. To perform resource assignments, a GPP may need to engage in interprocessor communication with one or more ASPs. The interprocessor communication may be difficult to perform in a manner consistent with the real-time requirements of transmitting a channel assignment on the downlink of a frame where the request was received on the uplink.

BRIEF SUMMARY

Methods and apparatuses for multi-phase handshaking are described. A user terminal (UT) transmits an initial resource request on an uplink of a frame, and a receiving access point or base station (BS) acknowledges the request on a downlink of the frame. The acknowledgement may operate to have the requesting UT await a delayed assignment. The UT may make a follow-up request on an uplink of a later frame, and the assignment is transmitted on a downlink of the later frame.

In one embodiment an application specific processor (ASP) receives the initial request and transmits the acknowledgement. The ASP may make the assignment to a resource of which it is aware that is available. Alternatively, a general purpose processor (GPP) may make the assignment. Where a GPP makes the assignment, the system may be enabled to use multiple phases to complete a handshaking sequence. In one embodiment a system capable of using multiple frames for handshaking may complete handshaking in a single frame.

The frame on which a UT is to make a follow-up request may be specified in the acknowledgement. Additionally, provisions may be provided for making re-transmitting requests and/or assignments on later frames in the case that such a signal may be lost. In one embodiment, consecutive frames may be used to provide for pipelined handshaking with multiple UTs on an access channel.

BRIEF DESCRIPTION OF THE DRAWINGS

The description of embodiments of the invention includes various illustrations by way of example, and not by way of limitation in the figures and accompanying drawings, in which like reference numerals refer to similar elements.

DETAILED DESCRIPTION

Figure 1:
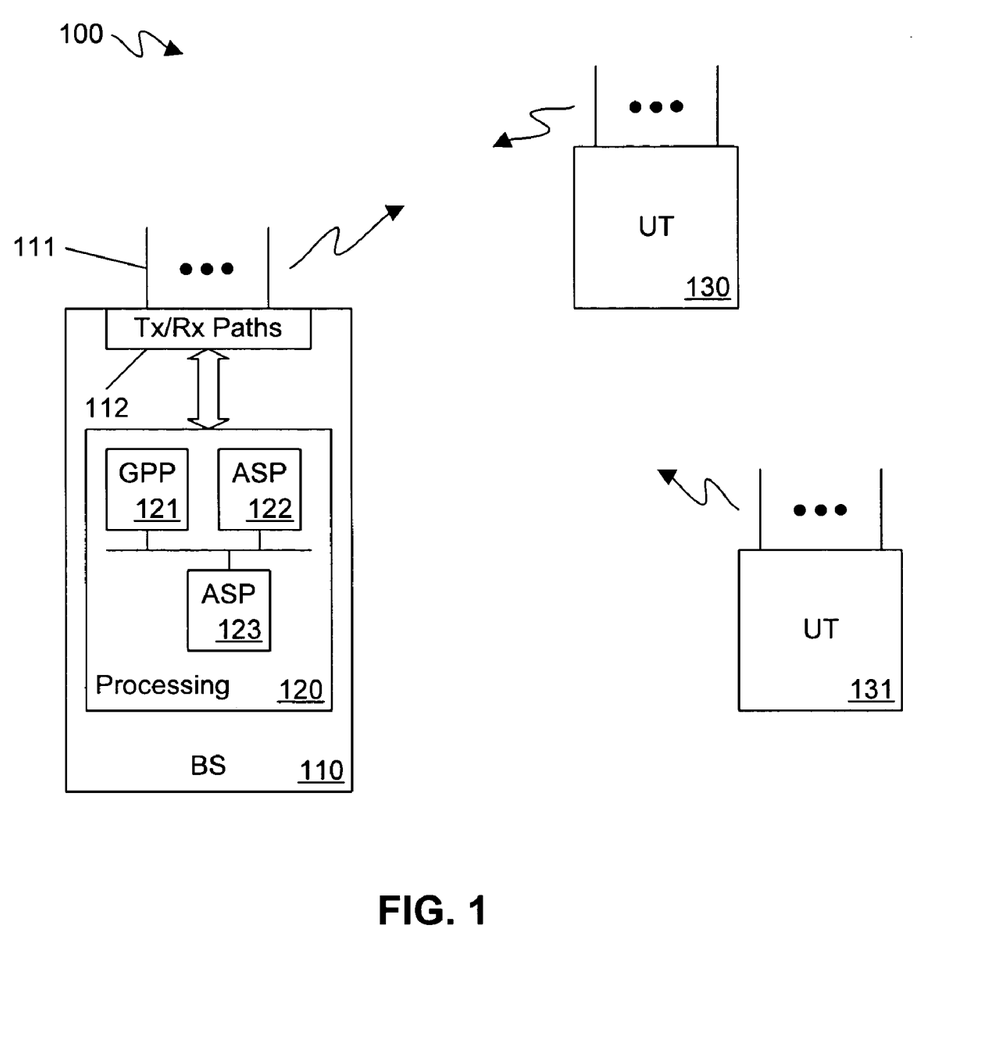
FIG. 1 is an illustration of a block diagram of a wireless system according to one embodiment of the invention.

FIG. 1 is an illustration of a block diagram of a wireless system according to one embodiment of the invention. System 100 includes an access point or a base station BS 110, which may provide wireless access for a cell, or specific geographic area. BS 110 may communicate with other wireless devices or units remote to BS 110. System 100 includes user terminals UTs 130-131. UTs 130-131 may be mobile or stationary user terminals. For example, UTs 130-131 include cellular phones, wireless capable handheld devices and/or personal digital assistants (PDAs), wireless network devices (e.g., laptop computers), etc. In one embodiment one or more of UT 130 and UT 131 may include an antenna array for spatial processing at the user terminal. Alternatively, UTs 130 and 131 may have more conventional single-antenna wireless capabilities.

BS 110 includes an antenna or antenna array 111. With a single antenna element, conventional traffic and/or control channels may be used. With an antenna array, BS 110 may subdivide the conventional channels into spatial channels based on diversity in time, frequency, and/or code channel. Thus, in one embodiment a controller managing a conventional channel may manage three spatial subchannels of the conventional channel. In one embodiment BS 110 employs a spatial division multiple access (SDMA) protocol to communicate with UTs 130-131. BS 110 includes transmit/receive (Tx/Rx) path(s) 112 from antenna array 111. Tx/Rx paths 112 may represent a combination of components such as pre- and/or post-processing circuits, filters, signal paths, etc., from the antenna element(s) 111 to the elements of processing 120. Processing 120 provides the processing of received signals and prepares transmit signals for transmission. This may include the use of complex weighting and spatial multiplexing and/or selective combining of signals for more effective use of spatial diversity in embodiments where an antenna array is employed.

Processing 120 may include a general purpose processor (GPP) 121 and none or more application specific processor(s) (ASPs) 122-123. GPP 121 represents a processor, microcontroller, and/or logic array employed by BS 110 to provide general processing for systems on BS 110. This may be a central processor that centrally manages system tasks. In one embodiment GPP 121 may not be a real-time capable processing unit. That is, for certain applications where timing deadlines are significant, a processor may be unable to process all data and/or instructions necessary to execute the processes/operations within the deadline. This may result from processor speed, number of processes to manage/execute, etc. A real-time processor is one that may be able to execute in a manner that meets the deadlines.

ASPs 122-123 represent logic arrays, digital signal processors (DSPs), application specific integrated circuits (ASICs), microcontrollers, system-on-a-chip circuits, etc., that perform specific processing and/or resource management/control tasks. In one embodiment an ASP is able to provide real-time processing capability. In one embodiment one of ASP 122 and 123 are employed to perform the signal processing of signals for the Tx and/or Rx paths of a particular antenna element of antenna array 111. Thus, if antenna array 111 includes multiple antenna elements, there may be multiple ASPs to control those resources. Alternatively, a single ASP may be employed to provide real-time signal processing of multiple transmit and receive signal paths for BS 110.

GPP 121 and ASPs 122-123 may be interconnected with an interprocessor bus to facilitate interprocessor communication. In one embodiment the speed of interprocessor communication may prevent GPP from being able to perform some processing tasks in real-time. For example, consider if ASP 122 were to control certain communication resources, such as hardware and/or software associated with a certain traffic channel (TCH) and/or a random access channel (RACH). Assume that one of the channels controlled by ASP 122 is a RACH used by UTs 130-131 to establish wireless links with BS 110. If UT 130 were to send a random access signal (RA) requesting a TCH, the RA may come to ASP 122 for processing. Because ASP 122 is receiving the RA for BS 110, and may either fulfill or forward the RA for assignment, ASP 122 may be referred to as the "source" processor.

In one embodiment ASP 122 forwards the RA to GPP 121, or prepares an interprocessor communication with information from the RA to send to GPP 121. GPP 121 may make a resource assignment of a TCH that UT 130 can use to communicate with BS 110, and indicate the assignment to source ASP 122. GPP 121 may also indicate the assignment to the processor that controls the assigned TCH. The processor that controls the assigned TCH may be referred to as the "target" processor. The target processor may or may not be the source processor. Thus, the target processor may be ASP 122, or it may be ASP 123, or some other processor in processing 120 that is not shown in FIG. 1. The number of processors in processing 120 is solely for purposes of illustration, and is not intended to be restrictive on a number of processors that must or may be included in processing 120. Thus, processing 120 could include more or fewer processors than what is shown.

In an alternate embodiment, source ASP 122 may make the resource assignment without indicating the RA to GPP 121. For example, ASP 122 may know the allocation of TCHs that it controls, and/or possibly know the allocation of TCHs of another processor in processing 120. Based on the knowledge ASP 122 has of resource allocation, it may be able to make a channel assignment in real time in response to the RA. This will be discussed in more detail below.

Execution of various processes/operations are discussed herein. Execution of processes/operations is to be understood as the manipulation, use, generation, etc., of electronic signals in the physical systems of an electronic device, e.g., an element of a wireless system. It is generally to be understood that a series of instructions may be executed on the electronic device, to cause the operations to occur. The instructions may be received by the processing systems of the device from a storage medium. A storage medium includes a manufactured article having electronic, magnetic, optical, acoustic, or other form of storage. This may include optical or magnetic disks, flash, random operating memory/random access memory devices, etc. A manufactured article includes a device used to provide instructions to an electronic device. Thus, an article may include content that provides instructions to an electronic device. The instructions cause the electronic device to perform various operations, as indicated in the content.

Figure 2:
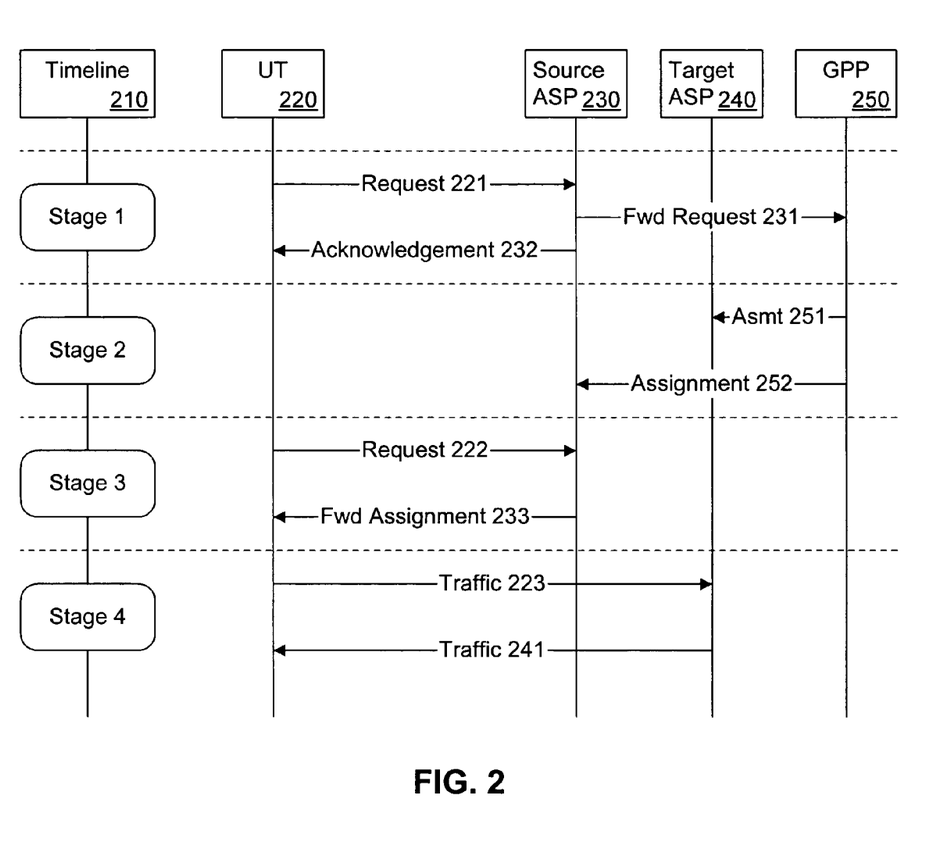
FIG. 2 is an illustration of an event diagram according to one embodiment of the invention.

FIG. 2 is an illustration of an event diagram according to one embodiment of the invention. Timeline 210 represents the relative timing of events in FIG. 2. Stages 1-4 are to be understood as logical steps in the process to be described, and do not necessarily represent any particular set of timing parameters or a particular sequence or series of events, processes, frames, etc. Thus, the various stages shown may or may not be temporally equal in size, and may or may not be contiguous in operation. For example, one stage may be completed in a single frame while another stage could span multiple frames. Each stage may include multiple wireless exchanges and/or execution of multiple processes. For example, a stage may include signal exchange between a BS and a UT for one or more wireless exchange periods, or defined periods during which wireless signal exchange between two wireless devices is to occur. In one embodiment this includes an uplink (e.g., from a UT to an access point), a downlink (e.g., from an access point to a UT), and/or a processing step. This could be a frame as specified/defined in a wireless communication protocol. Other events may occur in between. Because the stages represent logical groupings of events, they may also be grouped in other ways, and the event diagram of FIG. 2 may be represented with fewer or more stages.

In stage 1 UT 220 transmits request 221 to a BS, which request is received by source ASP 230, a processor on the BS that controls the channel over which request 221 was sent.

Request 221 may include an identifier of the resource UT 220 is seeking. Source ASP 230 generates forward request 231 from received request 221 and transmits forward request 231 to GPP 250. Forward request 231 may be a copy of request 221, or alternatively a message prepared with data included (e.g., a resource identifier, requester profile, etc.) associated with request 221. This may occur via interprocessor communication. In one embodiment GPP 250 and source ASP 230 are not located on the same hardware; thus, the interprocessor communication may be across hardware systems. In addition to forwarding request 231 to GPP 250, source ASP 230 transmits acknowledgement 232 to UT 220.

In traditional handshaking schemes a TCH assignment is transmitted on the downlink of the same frame on which request 221 was received on the uplink. In one embodiment UT 220 may send several requests on different channels and/or on different frames as it seeks a resource seeking a channel assignment on a downlink, if none is received. UT 220 may continue to seek a resource, for example, on another channel, until an assignment is received. Acknowledgement 232 can have the effect of halting UT 220 from seeking for a resource. An acknowledgement is to be understood as a signal transmitted in response to a received signal, e.g., a reply a verification signal, etc. Instead of receiving an assignment, UT 220 receives acknowledgement 232 that may indicate that the request is received and will be processed. In one embodiment acknowledgement 232 includes an indicator of when a resource assignment may be made.

Stage 2 as shown includes GPP 250 indicating to target ASP 240 and source ASP 230 the resource assignment made. Thus, assignment 251 is sent to target ASP 240, and assignment 252 is sent to source ASP 230. Assignments 251-252 indicate that target ASP 240 is the resource assigned to UT 220. Target ASP 240 in this description may represent a processor that controls a conventional and/or spatial channel, and the resource would be a channel controlled. In one embodiment target ASP 240 is not a separate physical device, but is a process or sequence of processes on, or physically part of a processor that controls various channels; target ASP 240 would thus represent the logic of the processor that controls the target channel.

While shown as a specific stage, the events of stage 2 may logically be considered part of another stage, for example, stage 1. A stage may be considered to include all events from the sending a resource request (or repeat request), e.g., requests 221-222, up to the sending of another request. For example, the sending of request 221 may be considered the start of a stage that lasts until the sending of request 222, making stage 2 a logical "part" of stage 1. Other groupings of events are possible. Thus, in one embodiment a handshaking stage spans multiple wireless exchange periods (e.g., frames). Alternatively, a stage may be considered to be an event in a sequence of handshaking events. Additionally, a system enabled to extend handshaking beyond a single stage may, in some circumstances, complete handshaking in a single stage.

In the case that handshaking extends beyond a single stage, in another stage of handshaking, UT 220 may make another request for the resource. For example, in stage 3 UT 220 transmits request 222, which is processed by source ASP 230. Because the resource assignment was indicated to source ASP 230 in a previous stage to request 222, source ASP 230 is aware of the resource assignment, and is able to provide forward assignment 233 during the stage in which request 222 was transmitted to indicate the resource assignment.

Although the exchange of traffic between the BS and UT 220 would not generally considered a stage in handshaking, stage 4 represents another logical event in the sequence, which is that the BS through the target resource (and associated controller) and UT 220 exchange traffic signals 223 and 241. Traffic exchange on the assigned target resource may continue for a specified or indefinite period.

In one embodiment handshaking includes GPP 250 centrally controlling resource assignments. GPP 250 in making assignments may assign a conventional channel, and allow a processor controlling the conventional channel to make a spatial channel assignment, or GPP 250 may make specific spatial channel assignments. If a specific spatial channel assignment is made, the spatial channel may be indicated in the assignment 251-252, or an associated signal.

In one embodiment GPP 250 uses an assignment algorithm based on load. For example, GPP 250 may make assignments based on lightest load first. If spatial channels are employed, a conventional channel with lighter use of its spatial channels may be assigned before a conventional channel that has a heavier spatial channel allocation in place. For example, a conventional channel that has two spatial channels in use may be disfavored for assignment over a conventional channel with only one spatial channel in use. This preference to lighter load can operate to manage the spatial flatness of a wireless system.

Figure 3:
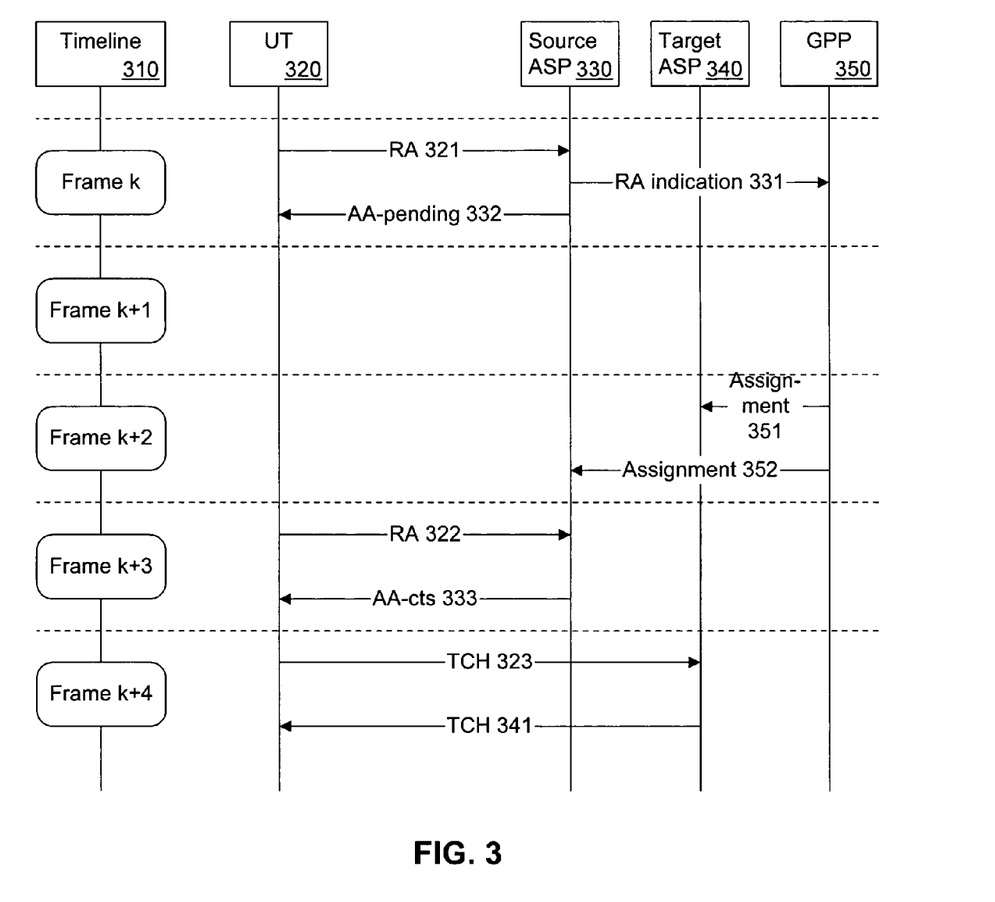
FIG. 3 is an illustration of an event diagram according to one embodiment of the invention.

FIG. 3 is an illustration of an event diagram according to one embodiment of the invention. In one embodiment multiple handshaking phases are spread over several frames, as depicted in FIG. 3, and so timeline 310 could represent events in order of temporal sequence. At frame k, some random point in time, UT 320 enters a handshaking sequence with a BS by sending a random access message RA 321 on an access channel (ACH) of the BS. The ACH may be a control channel, a random access channel (RACH), or other channel to receive handshaking requests. Source ASP 330 represents a processor, or process on a processor that controls the ACH.

Source ASP 330 may generate a signal to GPP 350, which will fulfill the resource request. As shown, RA indication 331 is sent from source ASP 330 to GPP 350 to indicate the resource request. The message may include a resource identifier for a requested channel, an identifier for requesting UT 320, or other information useful in the handshaking and resource assignment process.

Source ASP 330 transmits a message AA-pending 332 to indicate that an access assignment could be made but is not yet available. AA-pending 332 may differ from a normal access assignment in that a traditional access assignment will generally indicate the traffic channel (TCH) over which the UT will communicate with the BS. AA-pending 332, however, may indicate a period after which, or a window during which, requesting UT 320 should re-submit an RA to attempt to establish a link on a TCH. The period may, for example, be a number of frames, or a time period. In one embodiment AA-pending 332 indicates a minimum number of frames UT 320 should wait to re-submit the RA, and a maximum number of frames after which handshaking will need to re-initialized. Alternatively, a fixed, or a predefined amount of time or number of frames understood by both the BS and UT 320 may be employed. In this instance, a delay period need not be transmitted with AA-pending 332.

The number of frames, or alternatively the amount of time, AA-pending 332 may indicate depends upon the implementation of the system. In one embodiment AA-pending 332 indicates a minimum number of frames and/or a maximum number of frames. The minimum number of frames (e.g., min_frames) is a number of value zero or greater, and indicates how long a UT may wait prior to receiving an access assignment. The maximum number of frames (e.g., max_frames) is a number of value greater than zero that indicates how long a handshaking sequence is valid. Max_frames may indicate an indefinite duration. The values can be modified depending on the system. For example, a larger min_frames may be used in a system with a slower GPP 350 than a system with a faster GPP 350. Also, a larger max_frames may be used in a system loaded with processing tasks.

Alternatively, a number of frames or a time period may be specified for the system design, and both UT 320 and the BS will have the value prior to the initialization of handshaking. Using a minimum number of frames, for example, gives the BS time for GPP 350 to make a determination for an assignment. Using a maximum number of frames allows UT 320 to re-submit an RA, and time to make other attempts at re-submission if the first re-submission is lost. Using the maximum number of frames also allows the BS to have a threshold time after which it will be allowed to re-assign the allocated resource if UT 320 fails to establish the link during the window. In one embodiment the BS has a profile of a requesting UT (e.g., UT 320) and may determine that because of the profile of the UT, a longer delay period should be used to provide more time for the UT. The BS could adjust or use an appropriate delay period and/or handshaking window accordingly.

Thus, the example of FIG. 3 may have a minimum frames indication of three [k plus some minimum frame indicator, min_frames, equals k+3]. During frames k+1 and k+2 UT 320 halts transmission of RAs, and waits for the BS to make a resource assignment. Although the assignment signals are shown from GPP 350 to target ASP 340 and source ASP 330 during frame k+2, it is to be understood that the assignment signals could be sent at other times prior to the frame k+min_frames. Thus, assignments 351-352 may be made and sent earlier than frame k+2.

Frame k+3, would be the frame indicated by the minimum frames indication if the minimum frames were three. After this point, UT 320 may be granted an access assignment if another RA is sent. Thus, UT 320 transmits RA 322. Note that the multi-phased handshaking may provide for UT 320 to submit multiple repeat requests or follow-up requests. For ease of discussion, RA 321 may be considered to be the "initial" RA, where UT 320 enters handshaking, and RA 322 may be considered to be a "relaxed," or "extended" RA, meaning an RA sent under a handshaking mechanism that does not require real-time, single frame access assignment. Note that the initial and the extended RAs may have identical content and the BS from knowing of the previous request can determine that a later RA is an extended RA. In other embodiments the RA may be marked as a repeat request.

The initial RA and the extended RA need not be sent over the same channel, although they may be. In one embodiment a dedicated channel is used for the purposes of receiving extended RAs. In one example, a specific RACH may be used to receive initial RAs, and a specific channel may be indicated in an acknowledgement for sending a follow-up RA. The UT could be informed of the extended RA channel assignment in a manner similar to how the UT could be informed of a target resource assignment. For example, a field in AA-pending 332 may indicate a channel assignment for sending an extended RA, just as a field in an access assignment would indicate a channel assignment.

Thus, an initial RA 321 is transmitted, and an AA-pending 332 message is received in response. At a later period that may be indicated in AA-pending 332, UT 320 transmits an extended RA 322, which repeats and/or follows up the previous request, and in response receives an access assignment, represented as a clear to send signal AA-cts 333, to distinguish the access assignment signal from the access assignment "pending" 332 indication. Note that other AA message could be used in addition to, or replacing the AA-pending and AA-cts messages described with reference to FIG. 3. Some examples are given below with respect to FIG. 5.

In another embodiment, AA-pending 332 does not halt UT 320 from sending extended RAs, but indicates when UT 320 can expect a grant to be made. Thus, UT 320 may continue to send extended RAs in some or all frames subsequent to frame k on which RA 321 was sent, until an access assignment is received. The series of repeat requests may begin immediately after receiving AA-pending 332, or at some later frame.

AA-cts 333 indicates to UT 320 what resource has been allocated. Thus, it indicates target ASP 340 to UT 320. Once UT 320 receives its assignment and is clear to send on the allocated resource, it may send traffic on traffic channel (TCH) 323 to target ASP 340 on the BS, and target ASP 340 will send traffic on the TCH, as indicated by TCH 341 of the figure.

Figure 4:
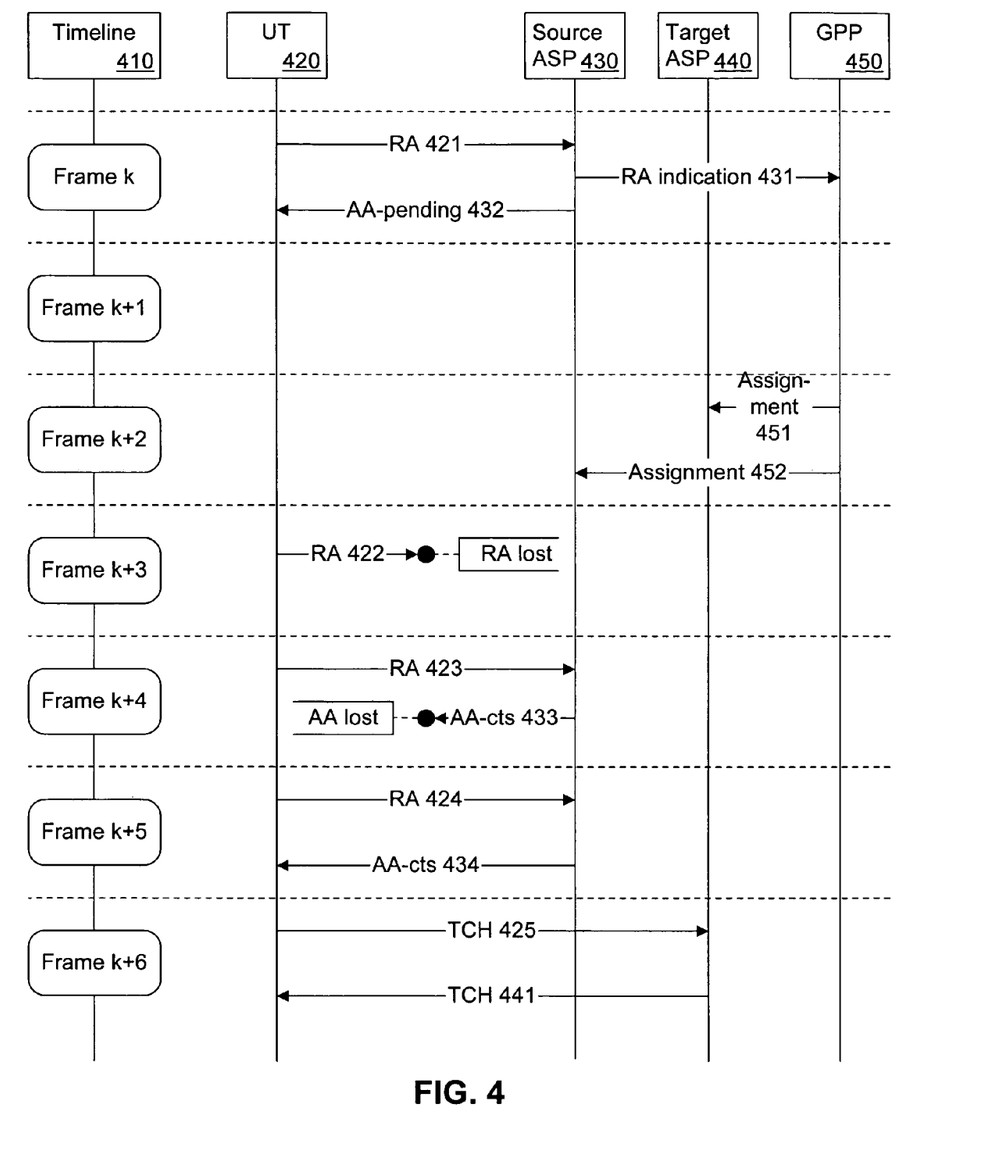
FIG. 4 is an illustration of an event diagram having message loss according to one embodiment of the invention.

FIG. 4 is an illustration of an event diagram having message loss according to one embodiment of the invention. Timeline 410 shows a sequence of events occurring on frames k to k+6. The system and events are similar in FIG. 4 to that discussed in FIG. 3. In the discussion of FIG. 3, the concept of signal loss was not addressed. Real systems may be lossy from causes such as noise (interference from devices and natural consequences external to the wireless system), interference between UTs, collision of RAs, etc.

In the simplest case, a single RA may be present per frame. In another embodiment a system will support receiving and processing various RAs during a single frame. Consider frame k+3 where UT 420 transmits a relaxed RA 422, which is lost. In the case of noise, RA 422 may be lost because of the limitations of the physical layers of the systems of source ASP 430; that is, if the signal is indistinguishable from the ambient noise threshold. In the case of interference, transmissions from other UTs on the same or other conventional channels may cause source ASP 430 to be unable to distinguish RA 422 from the transmissions in the transmit medium. In the case of collision, RAs may be transmitted from different UTs in, for example, the same uplink of the same frame. In the case of a RACH, UTs simply transmit on the RACH when they are ready, which may cause RAs from different UTs to collide. Source ASP 340 monitors the RACH, and attempts to resolve the signals received on it.

In one embodiment preferences are established for dealing with potential loss situations, especially collisions. For example, preference may be given to a signal of greater strength, because the signal is easier to resolve. Preference may be given to a relaxed RA over an initial RA. Thus, if another UT were to attempt to send an initial RA at frame k+3 and priorities were in place to prefer a relaxed RA, RA 422 of UT 420 may be resolved by source ASP 430, and the initial RA of the other UT would be discarded.

In one embodiment a UT will continually transmit a relaxed RA until the assignment is received. Thus, UT 420 transmits relaxed RA 422 at frame k+3, which may be lost. Because no assignment is received on the downlink of frame k+3, UT 420 again transmits relaxed RA 423 on frame k+4. Just as loss of the uplink is possible, loss of a downlink signal may occur for the same, or similar reasons. Thus, as depicted, AA-cts 433 that is sent on the downlink of frame k+4 by source ASP 430 in response to the receive relaxed RA 423 received on the uplink of frame k+4 is lost. Although the assignment was transmitted, because it was lost, UT 420 fails to receive the channel assignment.

Because no assignment is received on the downlink of frame k+4, UT 420 again transmits relaxed RA 424 on frame k+5. Assuming that frame k+5 is still within the window of acceptable transmissions of the relaxed RA, or handshaking window, as indicated by the original AA-pending 432 or a predefined constant, the assignment should be made. Thus, in response to relaxed RA 424 received on the uplink of frame k+5, source ASP 430 transmits AA-cts 434 to indicate the allocated TCH to UT 420. Note that in one embodiment, as part of the standard processing of relaxed RAs, the processing units (e.g., source ASP 430) may perform a check to determine if the window indicated in the AA-pending message has expired. In one embodiment, if the window has expired, source ASP 430 may treat the relaxed RA as an initial RA that begins the handshaking procedure over. With the TCH assignment, the link is established between UT 420 and the BS, and traffic is exchanged at frame k+6, as indicated by TCH 425 and TCH 441.

Figure 5:
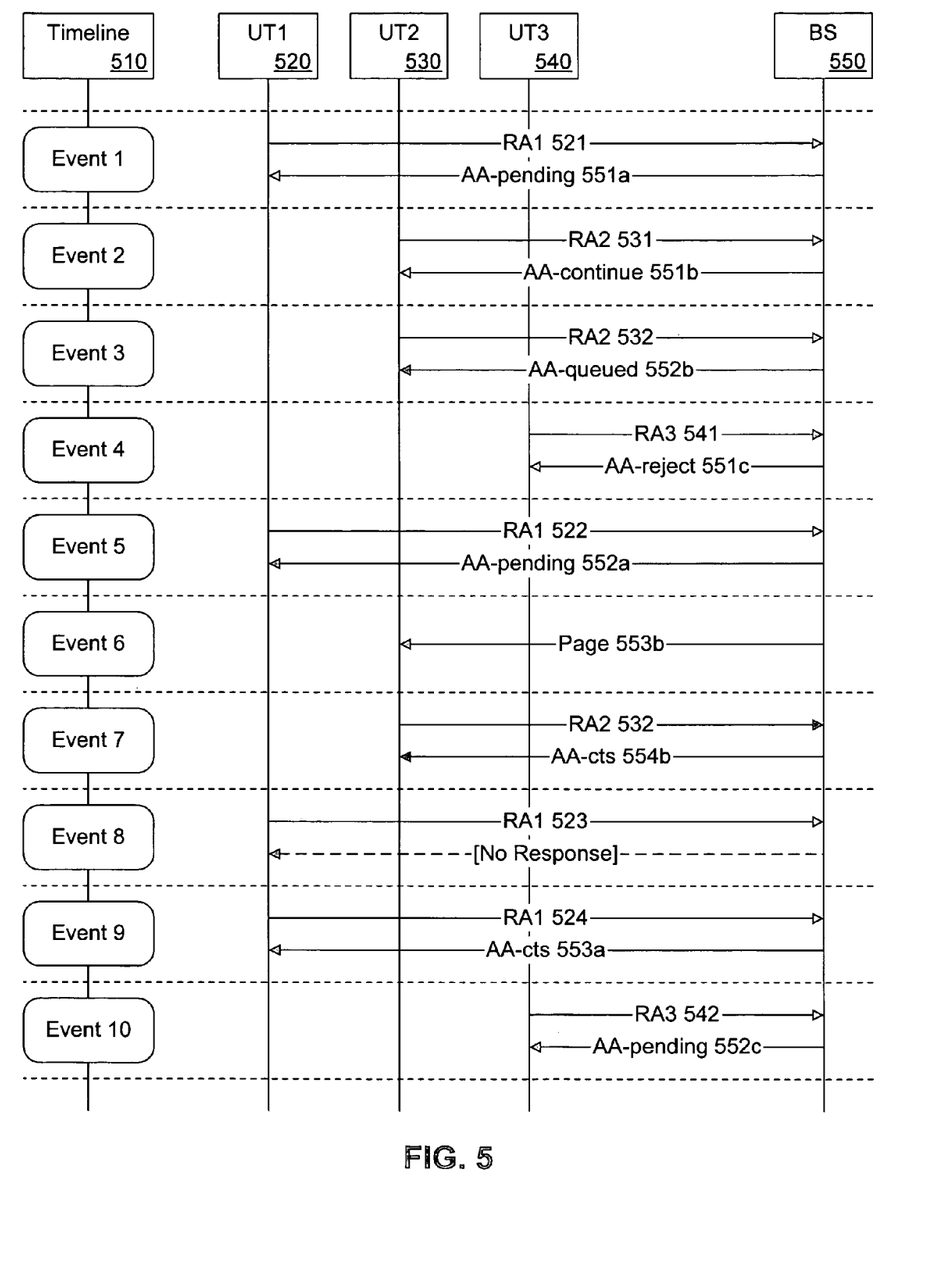
FIG. 5 is an illustration of an event diagram of a base station responding to user terminals with different acknowledgements according to one embodiment of the invention.

FIG. 5 is an illustration of an event diagram of a base station responding to user terminals with different acknowledgements according to one embodiment of the invention. Timeline 510 illustrates various events 1-10. Events 1-10 are to be understood as events in the wireless exchange between BS 550 and the UTs 520, 530, and 540. The events may or may not be contiguous in time, as other events not shown may occur between the events shown in FIG. 5. Events 1-10 are also not intended to indicate any temporal sequence, other than that which is described below such as can be understood from message dependency. Thus, the messages sent by BS 550 to UT1 520 may overlap with the messages sent to UT2 530 and/or UT3 540, or they may not.

Below various examples of AA messages are given. The examples are not intended to represent an exclusive list, and other messages could be conceived. The multi-phase handshaking described herein could be understood as including an assignment delay, i.e., an access assignment (link assignment, channel assignment) is not immediately given, but an acknowledgement of the request is sent to indicate that an assignment is intended to be given at some later time. Alternatively, they could stall indefinitely by indicating no available resources. The messages that delay access assignment (e.g., stall the UT), may be transmitted for various reasons, including insufficiency of number of resources, a load limitation procedure, channel allocation procedure, etc. A resource may be unavailable, or not immediately/presently available, if a threshold number of resource assignments has already been made. A resource may be considered to be available if the resource is idle, reserved for the requester, able to be allocated to the requester for traffic exchange, or otherwise not busy.

The acknowledgement may be considered to be a status message, or message that indicates the status of access assignment. For example, an access assignment grant is a status of "access assignment available." A pending message indicates a status of "not presently available." These and other messages are described below. Note that although the message are described separately, a handshaking sequence is to be understood as potentially incorporating any of the messages described herein.

At event 1, UT1 520 transmits an initial RA, RA1 521. This may be processed as discussed in other figures herein. The source and target processors or processes, and the general purpose processor explicitly shown in other figures are generically represented by BS 550. BS 550 may transmit AA-pending 551a, which indicates to UT1 520 that RA 521 was received, and may indicate a time at which UT1 520 may attempt to obtain a link assignment on the source processor.

UT2 530 transmits extended RA 531 to BS 550 at event 2 as part of a handshaking sequence entered at some time prior to the events shown in FIG. 5. BS 550 may respond to extended RA 531 with AA-continue 551b. The message AA-continue 551b informs UT2 530 that a TCH was not able to be granted immediately through the RA/AA relaxation sequences, and UT2 530 should fall back to an earlier RACH retry policy. The retry policy may be one that UT2 530 was employing prior to entering the RA/AA relaxation procedure. Thus, the relaxation sequences discussed herein may be used in a system that supports the relaxation mechanism as well as supporting more traditional handshaking techniques. After receiving AA-continue 55 1b, UT2 530 could exit its current handshaking sequence and attempt to obtain a channel assignment, for example, on another channel, or at a later time.

At event 3, UT2 530 may enter the RA/AA relaxation procedure by transmitting an initial RA2 531. In response to this request, BS 550 may send AA-queued 552b. AA-queued 552b acknowledges RA2 531, but does not indicate to UT2 530 to follow the same RA/AA relaxation described to this point. Instead, AA-queued 552b indicates to UT2 530 that the request will not presently be granted, and that the request has been noted. In one embodiment, AA-queued 552b may include a delay parameter period after which UT2 530 should follow up the request RA2 531.

In one embodiment BS 550 will page the UT associated with a queued RA. For example, once a resource becomes available, BS 550 may page UT2 530. In response to the paging message, UT2 530 may transmit RA2 532. This is illustrated at events 6 and 7. The TCH may be allocated in association with sending page 553b, and so RA 532 may be followed up with AA-cts 554b on the downlink of the same frame as RA 532. Alternatively, the RA/AA relaxation techniques described herein are employed after page 553b.

UT3 540 transmits initial RA3 541 at event 4. In response to RA3 541, BS 550 transmits AA-reject 551c. AA-reject 551c indicates to UT3 540 that the stream request was rejected. AA-reject 551c may include an indication to UT3 540 of how long to back off before re-attempting to establish a link with BS 550, indicate that another request channel should be used, etc. Compliance by UT3 540 prevents BS 550 from being overloaded with requests when it already knows it does not have sufficient resources to fulfill requests. At some later event 10, UT3 540 transmits RA3 542, which is acknowledged by AA-pending 552c. Although a pending message is shown in FIG. 5, it is understood that a resource may be allocated to UT3 540. If a resource is so allocated, an AA-cts message may alternately be used.

At event 5, UT1 520 transmits an extended RA1 522 in response to AA-pending 551a received from BS 550 earlier. Event 5 is understood to fall within the window for the extended RA, as described above. Suppose that RA1 522 is received at BS 550 at a moment when there is heavy loading on BS 550. Thus, even though AA-pending 551a caused UT1 520 to wait for a period of time, BS 550 may be unable to provide a resource assignment to UT1 520. In this case it is not because of the real-time characteristics or lack thereof of processing elements of BS 550, but because there may not be resources available. In one embodiment BS 550 responds in such a case by transmitting AA-pending 552b, which may be an identical message to AA-pending 551b transmitted previously. By again transmitting a pending indication to UT1 520, BS 550 is able to have more time to allocate a TCH for UT1 520. Although AA-pending 552b may be identical to AA-pending 551b, in some embodiments the messages are different, and may specify different wait periods for UT1 520.

Event 8 shows UT1 520 transmitting another relaxation RA1 523 at the appropriate time in response to AA-pending 552a. Suppose that BS 550, through an ASP, or a GPP, determines that there is a load on BS 550, but that a TCH should become available very shortly (e.g., within a couple of frames). In one embodiment BS 550 may determine to not send an AA to UT1 520, thus not acknowledging RA1 523. To UT1 520, this situation may appear just as though an AA had been transmitted, but lost, as discussed in FIG. 4. UT1 520 could handle this situation by re-transmitting the extended RA until an assignment is received.

Thus, at event 9 UT1 520 transmits extended RA1 524. Assuming BS 550 has indeed been able to allocate a TCH for UT1 520, it transmits AA-cts 553a to indicate the TCH to UT1 520. UT1 520 is then able to exchange traffic with BS 550 over the air interface.

Figure 6:
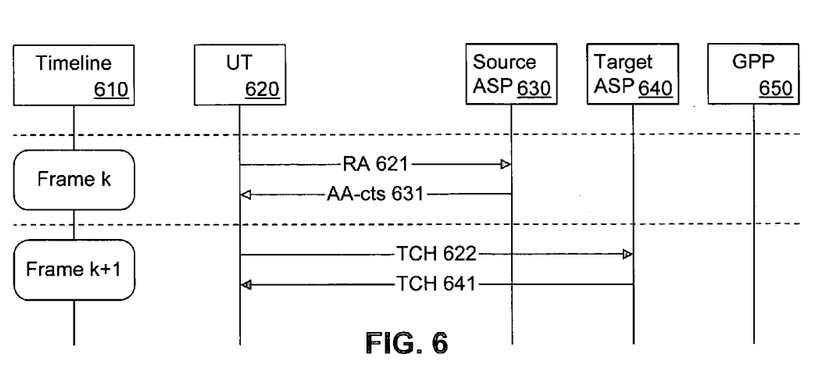
FIG. 6 is an illustration of an event diagram with a processor making a resource assignment according to one embodiment of the invention.

FIG. 6 is an illustration of an event diagram with a processor making a resource assignment according to one embodiment of the invention. In one embodiment source ASP 630 knows of the load on perhaps its own conventional channels and/or the conventional channels of another processor. Based on this information, intelligence for making channel assignment may be distributed in the BS among multiple, including real-time capable, source processor(s). For example, a group of related, physically proximate, and/or grouped source processors may share parameters among themselves. Thus, they may be able to distribute assignment determinations among the their combined resources. In this sense they share management of their combined resources, being able to assign directly controlled resources directly controlled, as well as assigning resources of another processor.

As shown, UT 620 transmits initial RA 621, which is received at source ASP 630. Although the BS is capable of multi-phase handshaking as described herein, in one embodiment source ASP 630 determines that target ASP 640 is available for assignment to UT 620. Source ASP 630, rather than sending an indication to the central processor that controls channel assignment (GPP 650), source ASP 630 transmits AA-cts 631 to indicate target ASP 640 to UT 620. At frame k+1, UT 620 is able to exchange traffic with the BS, as represented by TCH 622 and TCH 641.

In one embodiment GPP 650 queries the resource controllers to determine how to allocate resources for a received RA. In another embodiment GPP 650 may keep information on resource allocation within a storage location available to GPP 650. The storage location may also be accessible by the resource controllers to write directly when a resource is allocated, or the resource controllers, such as target ASP 640, may communicate to GPP 650 when a resource has been allocated. Thus, after source ASP 630 has allocated target ASP 640 to UT 620, source ASP 630 may indicate the assignment to GPP 650.

Figure 7:
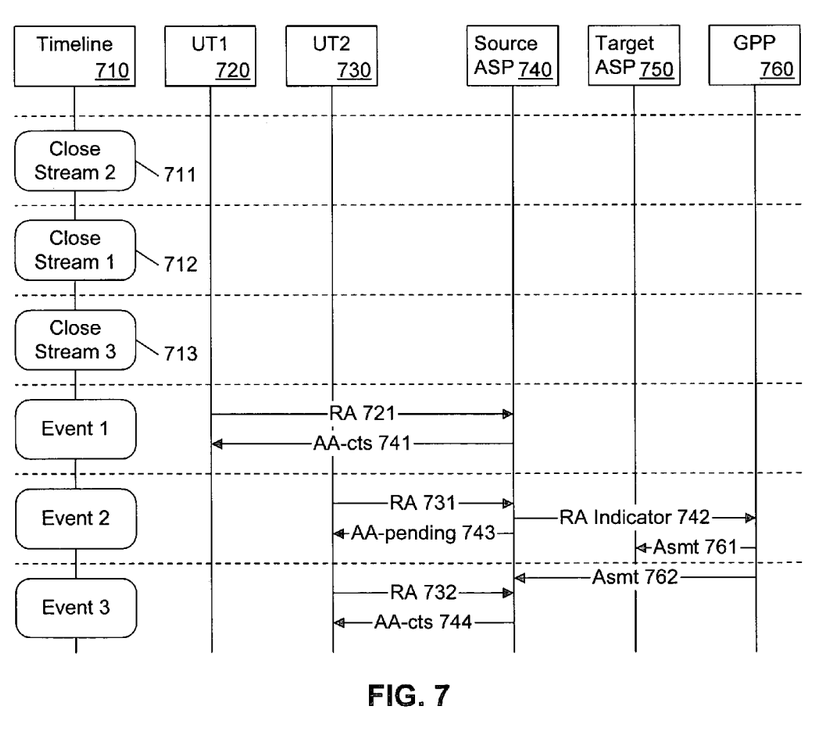
FIG. 7 is an illustration of an event diagram indicating order of resource assignment according to one embodiment of the invention.

FIG. 7 is an illustration of an event diagram indicating order of resource assignment according to one embodiment of the invention. Timeline 710 includes events 711-713, which are, respectively, close streams 2, 1, and 3. Streams 1-3 are to be understood as traffic streams, i.e., exchanged signals, including bursts, between wireless system elements, on the resources of the system elements. Thus, a TCH on a BS may be associated with a stream for the duration of exchange on the TCH. It is assumed that streams 1-3 that were open and used by various UTs to exchange traffic with a base station (BS). In one embodiment streams 1-3 are controlled by the same processing element of the BS. Thus, if no other events occur between events 711-713 that cause streams 1-3 to be re-allocated to other UTs, the processing element controlling streams 1-3 will likely be lightly loaded after the streams are closed.

Events 1-3, while not necessarily in any particular order, are to be understood as occurring somewhere after the processing element controlling streams 1-3 becomes lightly loaded, and before the TCHs associated with the streams are re-allocated, or before some other event that would cause the processing element to become more heavily loaded. In one embodiment target ASP 750 is the processing element.

At event 1, UT1 720 transmits initial RA 721 to request a resource. In one embodiment source ASP 740 notes that target ASP 750 is not heavily loaded and, on the downlink of the frame on which RA 721 was received, source ASP 740 assigns a TCH controlled by target ASP 750 to UT1 720. Note that target ASP 750 and source ASP 740 may be interrelated processors (e.g., the same processor, grouped processors, etc.). In one embodiment multiple processors may assign each other's resources, as discussed above with respect to FIG. 6. An appropriate AA-cts 741 message is transmitted to UT1 720 to indicate the assignment, and enable UT1 720 to engage in traffic exchange with the BS. In one embodiment AA-cts 741 transmitted by source ASP 740 indicates a target TCH for UT1 720 in accordance with a particular allocation/assignment algorithm. The algorithm may be useful in an instance where intelligence for access assignment is distributed.

In one embodiment, when source ASP 740 autonomously, or self-assigns the TCH, source ASP 740 assigns the TCH according to a most recently closed procedure. As discussed previously, when a source ASP, e.g., source ASP 740, autonomously, or independently, assigns a TCH, the source ASP may make the assignment with the involvement of GPP 760. Thus, in FIG. 7, stream 3 was closed at 713, later than either streams 1 or 2, and so is the most recently closed stream. Therefore, if source ASP 740 follows a most recently closed procedure, it would assign the TCH associated with previously closed stream 3 to UT1 720.

At event 2, UT2 730 transmits initial RA 731 to request a resource on the BS. In one embodiment source ASP 740 employs the RA/AA relaxation techniques discussed herein to provide a TCH assignment to UT2 730. This may include sending RA indicator 742 to GPP 760. GPP 760 may then provide an assignment, which is indicated to target ASP 750 (assignment 761), and to source ASP 740 (assignment 762). Note that these assignments are shown occurring somewhere within events 2 and 3. The sending of the assignments by GPP 760 may be considered to be a separate logical event, or may be considered part of event 2 or event 3, as a matter of logic. Thus, they are shown generically happening after AA-pending 743 is transmitted to UT2 730, and prior to UT2 730 sending an extended RA 732 to request an assignment. In response to RA 732, AA-cts 744 is transmitted to UT2 730.

In one embodiment, when GPP 760 assigns a TCH, it does so according to a least recently closed procedure. Thus, in FIG. 7, stream 2, which was closed at 711, is the least recently closed stream. Therefore, if GPP 760 follows a least recently closed procedure, it would assign the TCH associated with closed stream 2 to UT2 730. Note that while source ASP 740 is described as employing a most recently closed assignment mechanism, and GPP 760 is described as employing a least recently closed assignment mechanism, the use of the mechanism may be switched between the two processors.

Additionally, another assignment algorithm may be employed, either alone, or to resolve cases in which there is a conflict with using the most recently and least recently closed mechanisms. One conflict may arise if multiple streams are closed at the same time, giving a least recently used algorithm multiple options of resources from which to choose. One manner to resolve such a conflict may be to provide a conflict mechanism, such as having source ASP 740 select the TCH of smallest channel number, and GPP 760 select the TCH of largest channel number, or vice-versa. Assume the size of the stream numbers of FIG. 7 correspond to the size of the channel number. If source ASP 740 is to assign the TCH of smallest channel number, and all streams closed at the same time (events 711-713 occur simultaneously), it should assign the TCH of previously closed stream 2. Other mechanisms may involve having schedule tables stored that specify an order of assignment.

Figure 8:
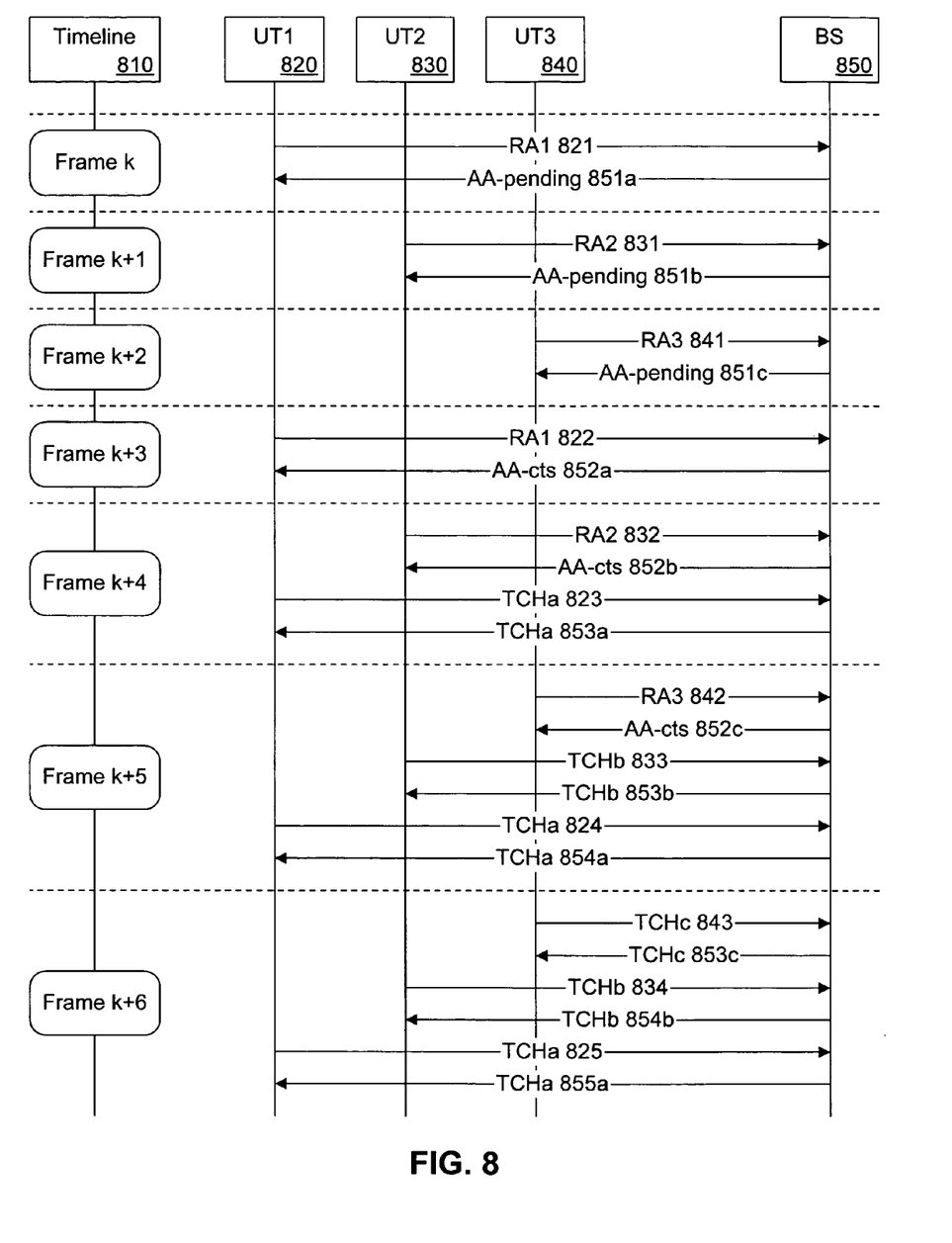
FIG. 8 is an illustration of an event diagram with pipelined assignments according to one embodiment of the invention.

FIG. 8 is an illustration of an event diagram with pipelined assignments according to one embodiment of the invention. With the use of the RA/AA relaxation techniques described herein, there may be times when a UT is idle while waiting for a resource assignment. During the idle time, a GPP at BS 850 may be determining what resource to assign to the UT. Additional UTs may make requests for access at BS 850 during the idle time. In one embodiment each request could be handled from start to finish before accepting another request for processing. In another embodiment there is capacity to process additional incoming resource requests prior to completing the assignment to the first UT. Thus, resource assignments could be pipelined. A pipelining technique provides efficient resource assignment, allowing more UT assignments to occur per unit time than may be possible by waiting for the completion of one assignment prior to accepting another request.

Timeline 810 includes various event markers, frames k to k+6. At frames k to k+2, each of UT1 820, UT2 830, and UT3 840 send initial RAs 821, 831, and 841, respectively, to request a TCH. In response to each RA, BS 850 transmits AA-pending messages 851a, 851b, and 851c, respectively, each on the frame corresponding to the one on which the RA is received. Thus, each UT may back off until the period assigned to transmit an extended RA, or proceed as has been previously described herein.

Assuming a minimum frame value of three in the AA-pending messages, UT1 820 will reach the start of its window to receive a channel assignment at frame k+3. At frame k+3 UT1 820 sends RA1 822, which is responded to with AA-cts 852a. AA-cts 852a indicates a resource, say TCHa, with which UT1 820 will exchange traffic with BS 850. Beginning on the frame following the assignment, frame k+4, UT1 820 will be able to exchange traffic bursts with BS 850.

In similar fashion, at frame k+4, as UT1 820 is able to exchange traffic, UT2 830 sends RA2 832 and receives AA-cts 852b, which indicates TCHb. Similarly, at frame k+5, now both UT1 820 and UT2 830 are able to exchange traffic with BS 850, and UT3 840 sends RA3 842, which is replied with AA-cts 852c, indicating TCHc. Thus, by frame k+6, UT1 820, UT2 830, and UT3 840 all have been allocated traffic channels with which to communicate with BS 850. Note that in general, TCHa, TCHb, and TCHc may not all be different from each other. They may be different spatial channels of a conventional channel.

Reference herein to an "embodiment" means that a particular feature, structure or characteristic described in connection with the described embodiment is included in at least one embodiment of the invention. Thus, repeated use of "in one embodiment" may describe features of various embodiments of the invention, and are not intended to be limited to all referring to the same embodiment. Besides what is described herein, it will be appreciated that various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method for wireless communication comprising:
receiving a random access message from a remote terminal on an uplink of a wireless exchange period;
determining whether to transmit on a downlink of the wireless exchange period an access assignment or an access assignment delay message indicating a period when an access assignment may be available;
transmitting to the remote terminal a signal having an access assignment or a delay message, based on what was determined, the delay message specifying a period the remote terminal should wait prior to transmitting a repeat random access message to attempt to obtain an access assignment, specifying a minimum number of exchange periods the remote terminal should wait and specifying a maximum number of exchange periods during which the remote terminal should attempt to transmit a repeat random access message to obtain an access assignment; and
receiving a repeat random access message at a time based on the delay message indicating the period when an access assignment may be available.

2. A method according to claim 1, wherein receiving the random access message comprises receiving the random access message on a channel dedicated to receiving random access messages.

3. A method according to claim 1, wherein transmitting the signal having the delay message further comprises transmitting a delay message to cause the remote terminal to send repeat random access messages on each subsequent exchange period until an access assignment is granted.

4. A method according to claim 1, further comprising transmitting a message in response to receiving the repeat random access message to indicate to the remote terminal that the random access message has been queued, and that the remote terminal will be paged upon availability of a channel.

5. A method according to claim 1, further comprising transmitting a message in response to receiving the repeat random access message to indicate to the remote terminal that the random access message is rejected due to unavailability of resources.

6. A method according to claim 1, further comprising:
receiving an additional random access message from an additional remote terminal during the waiting period of the remote terminal;
determining whether to transmit an access assignment or a delay message to the additional remote terminal; and
transmitting to the additional remote terminal a signal having an access assignment or a delay message, based on what was determined, prior to the end of the wait period specified to the remote terminal.

7. A method according to claim 1, further comprising transmitting an access assignment in response to receiving the repeat random access message.

8. A method according to claim 1, further comprising transmitting another delay message to the remote terminal in response to receiving the repeat random access message.

9. A method according to claim 1, wherein transmitting the signal specifying the period the remote terminal should wait comprises transmitting a signal that causes the remote terminal to wait for a predefined number of exchange periods prior to transmitting a repeat random access message to attempt to obtain an access assignment.

10. A method according to claim 1, wherein determining whether to transmit an access assignment or a delay message comprises determining an access assignment based on assigning to the remote terminal a conventional channel with fewer traffic streams prior to assigning a conventional channel having more traffic streams.

11. A method according to claim 1, wherein receiving the random access message comprises a wireless channel controller receiving the random access message, and wherein determining to transmit a delay message further comprises the channel controller transmitting a delay message to the remote terminal, and forwarding the random access message to a general purpose processor for an access assignment, the general purpose processor to centrally manage spatial channel assignment.

12. A method according to claim 1, wherein determining whether to transmit an access assignment or a delay message further comprises an application specific processor autonomously determining to transmit an access assignment for a channel controlled by the application specific processor.

13. A method according to claim 12, wherein the application specific processor autonomously determining to transmit the access assignment further comprises the application specific processor determining a load on channels managed by the application specific processor, and autonomously assigning the access assignment based on the determined load.

14. A method according to claim 12, wherein determining whether to transmit an access assignment or a delay message further comprises a central processor centrally managing access assignment allocation, and wherein the central processor and the application specific processor determining to transmit an access assignment further comprises the processors determining to assign one of multiple available channels based on an order in which available channels became available.

15. A method according to claim 1, wherein determining to transmit the delay message comprises determining to transmit a message indicating to the remote terminal that the random access message has been queued, and that the remote terminal will be paged upon availability of a channel.

16. A method according to claim 1, wherein determining to transmit the access assignment or the delay message further comprises determining to transmit a message indicating to the remote terminal that the random access message is rejected due to unavailability of traffic channels.

17. A method according to claim 1, further comprising receiving a repeat random access message from the remote terminal in response to transmitting a delay message.

18. A method according to claim 17, wherein receiving the repeat random access message comprises receiving the repeat random access message at a higher transmission power from the remote terminal than the original random access message.

19. A method according to claim 17, wherein receiving the repeat random access message comprises receiving the repeat random access message on a channel dedicated to receiving repeat random access messages.

20. A method comprising:
receiving on an uplink of a wireless communication event a resource request;
transmitting on a downlink of the event an acknowledgement, the acknowledgement indicating that a resource assignment is not immediately available, the acknowledgement including a delay parameter to indicate a period when the resource assignment may be available, the delay parameter specifying a period a remote terminal should wait prior to transmitting a repeat resource request to attempt to obtain a resource assignment, and specifying a minimum number of exchange periods the remote terminal should wait and a maximum number of exchange periods during which the remote terminal should attempt to transmit a repeat resource request to obtain the resource assignment;
receiving on an uplink of a later wireless communication event a follow-up request; and
transmitting on a downlink of the later event, in response to the follow-up request, the resource assignment.

21. A method according to claim 20, wherein receiving the resource request on the uplink of the wireless communication event comprises receiving the request on the uplink of a frame, the frame complying with a frame definition of a wireless communication protocol.

22. A method according to claim 20, wherein transmitting the acknowledgement comprises transmitting the acknowledgement, the acknowledgement to indicate a delay period for making a resource assignment, and wherein receiving the follow-up request comprises receiving the follow-up request after the delay period indicated.

23. A method according to claim 20, wherein transmitting the acknowledgement comprises transmitting an acknowledgement, the acknowledgement to indicate that the request has been queued, and will be processed at a later time.

24. A method for wireless handshaking, comprising:
sending a channel request to an access point on an uplink of a frame;
receiving on a downlink of the frame a channel assignment status message in response to sending the channel request, the status message indicating a delay period during which the assignment will not be available, the status message indicating either an assignment is pending and will be available after the delay period, or else the request has been queued and will be processed later, where the message indicating the request has been queued and will be processed later includes an indication that a paging message will be received, where the message causes the halting of sending a repeat channel request until the paging message is received; and
sending a repeat channel request on an uplink of a later frame if the status message indicates an assignment is unavailable.

25. A method according to claim 24, wherein sending the repeat request comprises sending the repeat channel request at a higher power than the power at which the channel request was sent.

26. A method according to claim 24, wherein sending the repeat request comprises sending the repeat request on a different channel than the channel on which the channel request was sent.

27. A method according to claim 24, wherein sending the repeat request comprises sending a repeat request on every frame later than the frame on which the request was sent, until an assignment is received.

28. An article of manufacture comprising:
a computer readable medium having content stored thereon embodying computer executable instructions to cause a computer to perform operations comprising:
receiving a random access message from a remote terminal on an uplink of a wireless communication frame;
determining whether to transmit on a downlink of the frame an access assignment or an access assignment delay message indicating a period when an access assignment may be available;
transmitting to the remote terminal a signal having an access assignment or a delay message, based on what was determined, the delay message specifying a number of frames the remote terminal should wait prior to transmitting a repeat random access message to attempt to obtain an access assignment, specifying a minimum number of frames the remote terminal should wait, and specifying a maximum number of frames during which the remote terminal should attempt to transmit a repeat random access message to obtain an access assignment; and receiving a repeat random access message at a time based on the delay message indicating the period when an access assignment may be available.

29. An article of manufacture according to claim 28, wherein the instructions for receiving the random access message comprise instructions for receiving the random access message on a channel dedicated to receiving random access messages.

30. An article of manufacture according to claim 28, wherein the instructions for transmitting the signal having the delay message further comprise instructions for transmitting a delay message to cause the remote terminal to send repeat random access messages on each subsequent exchange period until an access assignment is granted.

31. An article of manufacture according to claim 28, wherein the instructions for determining to transmit the delay message comprise instructions for determining to transmit a message indicating to the remote terminal that the random access message has been queued, and that the remote terminal will be paged upon availability of a channel.

32. An article of manufacture according to claim 28, wherein the instructions for determining to transmit the access assignment or the delay message further comprise instructions for determining to transmit a message indicating to the remote terminal that the random access message is rejected due to unavailability of resources.

33. An article of manufacture according to claim 28, further comprising instructions for transmitting an access assignment in response to receiving the repeat random access message.

34. An article of manufacture according to claim 28, further comprising instructions for transmitting another delay message to the remote terminal in response to receiving the repeat random access message.

35. An article of manufacture according to claim 28, wherein the instructions for transmitting the signal specifying the period the remote terminal should wait comprise instructions for transmitting a signal that causes the remote terminal to wait for a predefined number of frames prior to transmitting a repeat random access message to attempt to obtain an access assignment.

36. An article of manufacture according to claim 28, wherein the instructions for determining to transmit a delay message further comprise instructions for transmitting a delay message to the remote terminal, and forwarding the random access message to a general purpose processor for an access assignment, the general purpose processor to centrally manage spatial channel assignment.

37. An article of manufacture according to claim 36, wherein the instructions for determining whether to transmit an access assignment or a delay message further comprise instructions for determining a load on channels managed by an application specific processor, and autonomously assigning the access assignment based on the determined load.

38. An article of manufacture according to claim 28, wherein the instructions for determining to transmit the delay message comprise instructions for determining to transmit a message indicating to the remote terminal that the random access message has been queued, and that the remote terminal will be paged upon availability of a channel.

39. An article of manufacture according to claim 28, further comprising instructions for receiving a repeat random access message from the remote terminal in response to transmitting a delay message.

40. An article of manufacture according to claim 39, further comprising instructions for receiving a repeat random access message at a higher transmission power from the remote terminal than the random access message.

41. An article of manufacture according to claim 39, further comprising instructions for receiving a repeat random access message on a spatial channel dedicated to receiving repeat random access messages.

42. A wireless device comprising:

an antenna array to receive a wireless communication including a resource request from a remote unit, and transmit a wireless communication including sending a message in response to the resource request; and a processing unit coupled with the antenna array to process the communications, the processing unit to have a central processor to manage assignment of resources and an application specific processor to control a resource, the processing unit to process the resource request received at the antenna array on a frame of a wireless communication and prepare a message to be transmitted on the frame from the antenna array to the remote unit in response to the resource request, the prepared message to indicate either a resource assignment or a status of a resource assignment, the message to operate to extend handshaking over multiple frames and to indicate that the resource request has been queued and a resource assignment will not be given on the frame, wherein the processing unit has an additional application specific processor, where the application specific processor knows of an availability of resources of the additional application specific processor, and wherein the application specific processor to independently prepare the resource assignment includes the application specific processor to prepare a resource assignment for a resource of the additional application specific processor.

43. A wireless device according to claim 42, wherein the antenna array to receive the resource request comprises the antenna array to receive a message from the remote unit entering a handshaking sequence with the wireless device.

44. A wireless device according to claim 42, wherein the processing unit to prepare the message to operate to extend handshaking comprises the processing unit to prepare a message to indicate a resource request should be made by the remote unit at a later frame.

45. A wireless device according to claim 44, further comprising the antenna array to receive, and the processing unit to process a resource request made by the remote unit at a later frame in response to the message to indicate a resource request should be made at a later frame.

46. A wireless device according to claim 45, further comprising the processing unit to prepare a message in response to the later resource request, the message to indicate a resource request should be made by the remote unit at a later frame.

47. A wireless device according to claim 45, further comprising the processing unit to prepare a message in response to the later resource request, the message to indicate a resource assignment.

48. A wireless device according to claim 45, further comprising the processing unit to prepare a message in response to the later resource request, the message to indicate no resource assignment will be made, and the remote unit should attempt a different handshaking sequence.

49. A wireless device according to claim 42, wherein the processing unit to process the request comprises the application specific processor to process the resource request and indicate the resource request to the central processor.

50. A wireless device according to claim 42, wherein the processing unit to process the request comprises the application specific processor to process the resource request and independently prepare a resource assignment in response to the resource request.

51. An electronic circuit comprising:
  a general purpose processor to manage traffic channel assignment for a wireless device;
  an application specific processor coupled with the general purpose processor to manage a traffic channel, the application specific processor to receive a random access message on a frame and determine whether to make a traffic channel assignment on the frame or indicate on the frame to the wireless device of the random access message that a traffic channel assignment is unavailable at the time of the frame, and to indicate a future frame at which the wireless device may repeat the random access message, including a maximum number of frames by which the wireless device should repeat the random access message; and
  an additional application specific processor to manage an additional traffic channel coupled with the application specific processor; wherein the application specific processor to make the traffic channel assignment further comprises the application specific processor to assign the additional traffic channel of the additional application specific processor.

52. An electronic circuit according to claim 51, wherein the application specific processor comprises a digital signal processor.

53. An electronic circuit according to claim 51, wherein the application specific processor comprises an application specific integrated circuit.

54. An electronic circuit according to claim 51, wherein the application specific processor to receive the random access message comprises the application specific processor to receive the random access message on a dedicated random access message channel.

55. An electronic circuit according to claim 51, wherein the application specific processor to indicate the future frame further comprises the application specific processor to indicate a minimum number of frames the sender should wait prior to repeating the random access message.

56. An electronic circuit according to claim 51, wherein the application specific processor to indicate the future frame further comprises the application specific processor to indicate a channel on which to repeat the random access message on a future frame.

57. An electronic circuit according to claim 51, wherein the application specific processor to receive the random access message comprises the application specific processor to receive a handshaking message in a handshaking sequence, and wherein the application specific processor to indicate an assignment is unavailable comprises the application specific processor to indicate to the wireless device to exit the handshaking sequence.

58. An electronic circuit according to claim 51, wherein the application specific processor to indicate an assignment is unavailable comprises the application specific processor to indicate the random access message has been queued.

59. An electronic circuit according to claim 58, comprising the application specific processor to cause a paging signal to be sent to the wireless device to indicate to the wireless device to repeat the random access message.

* * * * *